United States Patent [19]
Simon Bacardit

[11] Patent Number: 6,085,522
[45] Date of Patent: Jul. 11, 2000

[54] BOOSTED BRAKING DEVICE WITH VARIABLE BOOST RATIO AND REDUCED HYSTERESIS

[75] Inventor: Juan Simon Bacardit, Drancy, France

[73] Assignee: Robert Bosch Technology Corporation, Broadview, Ill.

[21] Appl. No.: 08/913,905
[22] PCT Filed: Sep. 17, 1997
[86] PCT No.: PCT/FR97/01631
    § 371 Date: Sep. 24, 1997
    § 102(e) Date: Sep. 24, 1997
[87] PCT Pub. No.: WO98/22319
    PCT Pub. Date: May 28, 1998

[30] Foreign Application Priority Data

Nov. 22, 1996 [FR] France .................................. 96 14264

[51] Int. Cl.⁷ .................................................. B60T 13/20
[52] U.S. Cl. ............................................................ 60/553
[58] Field of Search .............................. 60/552, 553, 574

[56] References Cited

U.S. PATENT DOCUMENTS 2,959,011  11/1960  Randol ...................................... 60/553
3,387,455   6/1968  Eggstein ................................... 60/553

Primary Examiner—F. Daniel Lopez
Attorney, Agent, or Firm—Leo H McCormick, Jr.; Warren Comstock

[57] ABSTRACT

A braking device for a motor vehicle comprises a master cylinder (200) and a pneumatic booster (100). The pneumatic booster includes a rigid casing (10) divided by at least one moving partition (16) into at least two chambers (12, 14). A main hydraulic piston (30) of the master cylinder (200) includes a reaction piston (34) which slides in a hollow moving cylinder (32). The reaction piston includes a normally open two-way valve (94, 95) which can interrupt communication between an interior (V) of the master cylinder and the interior (35) of the moving cylinder (32); a first part (50) which abuts against the moving cylinder (32), in the rest position; and a second part (52) which abuts against the first part (50), in the rest position. A stepped third piston (82) slides inside a stepped bore (84, 85) of the moving cylinder (32) and abuts against the first part (50), in the rest position. The third piston (82) includes a central opening (90) allowing the interior (35) of the moving cylinder (32) communicate with the interior volume of the master cylinder (200). The diameter of the front portion (84) of the stepped bore is smaller than the diameter of the rear portion (85) of the stepped bore.

6 Claims, 3 Drawing Sheets

BOOSTED BRAKING DEVICE WITH VARIABLE BOOST RATIO AND REDUCED HYSTERESIS

The present invention relates to boosted braking devices for motor vehicles, comprising a master cylinder controlling the hydraulic pressure in the brake circuit connected to the brakes of the vehicle, this master cylinder being capable of being actuated by a pneumatic booster when the driver of the vehicle depresses the brake pedal.

In the conventional way, the master cylinder is filled with a brake fluid and equipped with a main hydraulic piston intended to receive an actuating force composed of an input force and of a boost force both acting in an axial direction.

Furthermore, the pneumatic booster can be operated by applying the input force to an operating rod controlling the opening of a valve, so as to exert the actuating force on the main hydraulic piston of the master cylinder, the booster including a rigid casing divided in leaktight fashion into two chambers by means of a moving partition which can be acted upon by a difference in pressure between the two chambers resulting from the opening of the valve and of driving along a pneumatic piston which can move with respect to the casing and bearing the valve, the input force being transmitted via a plunger which is also subject to the hydraulic pressure prevailing in the master cylinder.

In these devices, the main hydraulic piston of the master cylinder itself includes a hollow moving cylinder communicating with the master cylinder, receiving at least part of the boost force, and inside which there slides, in leaktight fashion and in the axial direction, a reaction piston capable of receiving at least the input force, elastic means exerting an elastic force between the reaction piston and the moving cylinder and urging the reaction piston in the direction of the master cylinder, at least one opening being made in the moving cylinder in order to make the interior of the latter communicate with the interior of the master cylinder.

Such a device is described, for example, in document FR-A-2,658,466.

These devices with hydraulic reaction have as their main advantage the fact that however intense the braking action and however great the rate of application of the input force, their characteristic operating curve, namely the curve giving the pressure in the master cylinder as a function of the intensity of the input force of the booster, is unchanged. These devices therefore show no lengthening in the response time in the case of emergency braking.

They do, however, have the drawback of having substantial hysteresis between the actuation and release phases, this being particularly significant in the most commonplace braking actions, namely those which have no emergency nature.

The present invention falls within this context, and its object is to propose a boosted braking device with hydraulic reaction which has improved operating characteristics in the case of emergency braking and which has no hysteresis, without the need for sensors or a complicated electronic circuit, and which is therefore of lower cost, while operating reliably under all circumstances.

To this end, the present invention proposes a boosted braking device for a motor vehicle, comprising on the one hand a master cylinder filled with a brake fluid and equipped with a main hydraulic piston intended to receive an actuating force composed of an input force and of a boost force both acting in an axial direction, and on the other hand a pneumatic booster which can be operated by applying the input force to an operating rod secured to a plunger controlling the opening of a three-way valve, so as to exert the actuating force on the main hydraulic piston, the booster including a rigid casing divided in leaktight fashion into at least two chambers by means of at least one moving partition which can be acted upon by a difference in pressure between the two chambers resulting from the opening of the three-way valve and of driving along a pneumatic piston which can move with respect to the casing, bearing the three-way valve and contributing at least to transmitting the boost force, the main hydraulic piston of the master cylinder itself including a hollow moving cylinder communicating with the interior volume of the master cylinder, receiving at least part of the boost force, and inside which there slides, in leaktight fashion and in the axial direction, a reaction piston capable of receiving at least the input force, first elastic means exerting a first elastic force between the reaction piston and the moving cylinder and urging the reaction piston in the direction of the master cylinder, at least one opening being made in the moving cylinder in order to make the interior of the latter communicate with the interior of the master cylinder, the reaction piston including a two-way valve means which is normally open, capable of interrupting the communication between the interior volume of the master cylinder and the interior of the moving cylinder, the reaction piston being composite and including a first part which, in the position of rest, is in abutment against the moving cylinder under the effect of the first elastic means, and a second part capable of sliding with respect to the first part, second elastic means exerting a second elastic force backwards on the second part in order to urge it into abutment, in the position of rest, against the first part, the second part being capable of sliding in leaktight fashion in the first part, a third piston being capable of sliding in leaktight fashion inside the moving cylinder, the third piston being urged backwards by third elastic means so that in the position of rest it comes into abutment on the first part, the second elastic means being arranged between the second part and the third piston, the third piston being formed with a central opening making the interior of the moving cylinder communicate with the interior volume of the master cylinder, the two-way valve means being formed by a seat arranged on the second part or on the third part.

According to the present invention, the third piston is stepped and slides in leaktight fashion in a stepped bore of the moving cylinder, the diameter of the front portion of the stepped bore being smaller than the diameter of the rear portion of this bore.

Thanks to this arrangement, upon an emergency braking action, the first and second parts of the reaction piston can slide one with respect to the other and actuate the two-way valve means in the direction of closure, so that the reaction piston receives the master cylinder internal pressure reaction only on a cross section which is smaller than that on which it receives this pressure reaction during braking under normal conditions, this resulting in the boost ratio of the boosted braking device being higher under emergency braking than it is for braking under normal conditions. During a braking action not under emergency conditions, the stepped piston forms a differential piston forcing the two-way valve to open and thus avoiding any hysteresis.

Further objectives, features and advantages of the invention will emerge clearly from the description which follows of one embodiment given by way of non-limiting example with reference to the attached drawings in which:

FIG. 3 represents the curve of the pressure generated by the master cylinder as a function of the effort applied to the brake pedal, this curve being obtained with the boosted braking device in accordance with the present invention.

Figure 1:
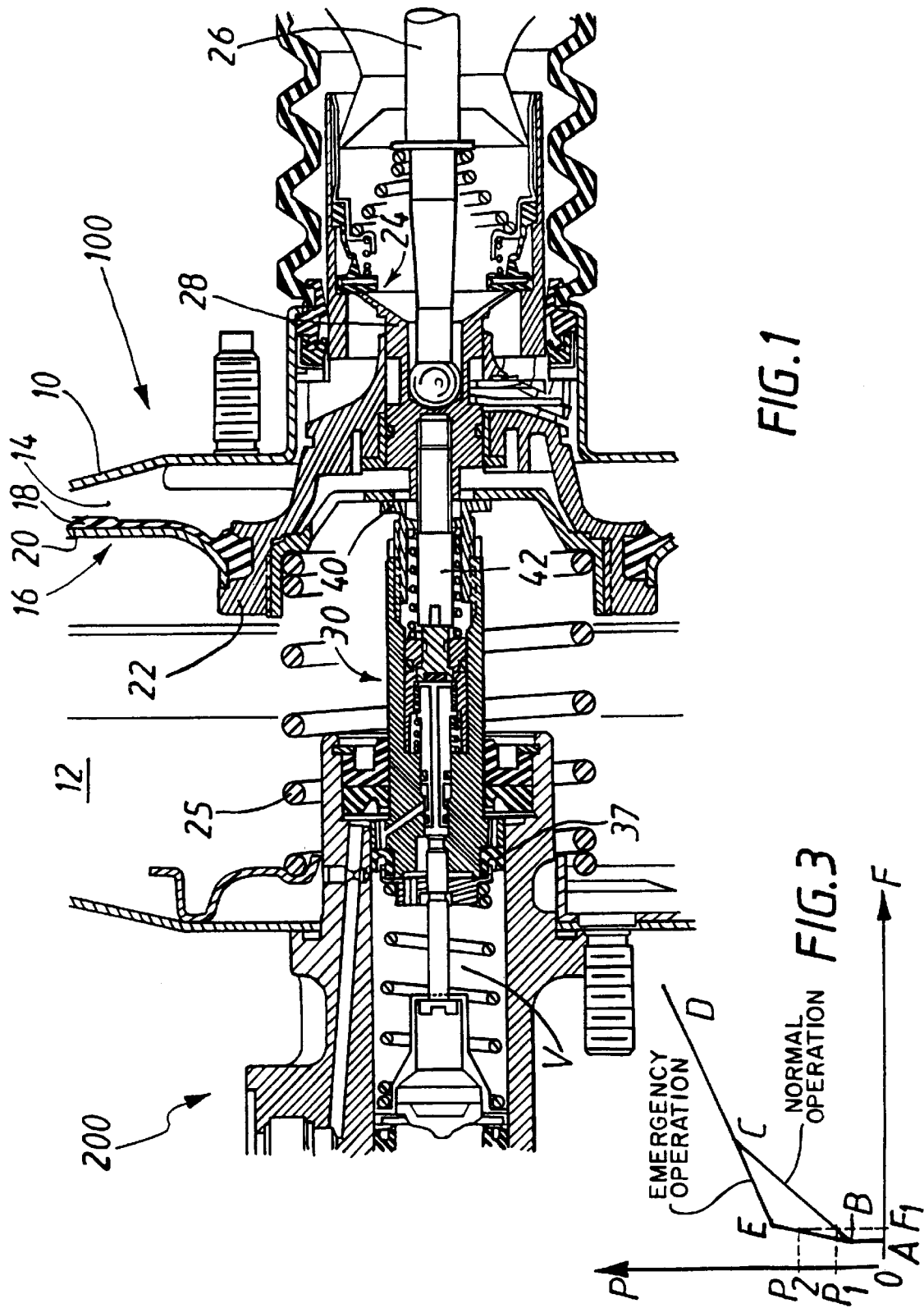
FIG. 1 represents a sectional view of a boosted braking device produced in accordance with the present invention.

Insofar as the invention relates only to an improvement made to pneumatically boosted braking systems, and as the general construction and operation of such systems are well known to the person skilled in the art, they will be recalled here just briefly in order to allow complete understanding of the improvement that the invention represents.

Schematically, a system of this type comprises a booster 100 and a master cylinder 200.

The booster 100, only the central part of which has been represented, is designed to be fixed in the usual fashion to a bulkhead (not represented) separating an engine compartment of a vehicle from the cockpit of this vehicle and to be actuated by a brake pedal (not represented) situated in this cockpit. The master cylinder 200, only the rear part of which has been represented, operates the hydraulic braking circuit of the vehicle and is fixed to the front wall of the booster 100.

By convention, that part of the booster/master cylinder assembly which points towards the master cylinder 200 is called the "front" and that part of this assembly which points towards the brake pedal is called the "rear". In the figures, the front is thus to the left and the rear to the right.

The booster 100 itself comprises a rigid casing 10, the interior volume of which is divided into a front chamber 12 and a rear chamber 14 in leaktight fashion by a moving partition 16 comprising a membrane 18 and a rigid skirt 20 and capable of driving along a pneumatic piston 22 which can move inside the casing 10.

The front chamber 12, the front face of which is closed in leaktight fashion by the master cylinder 200, is permanently connected to a source of partial vacuum (not represented). The pressure in the rear chamber 14 is controlled by a three-way valve 24, operated by an operating rod 26 connected to the brake pedal and secured to a plunger 28.

When the operating rod 26 is in the position of rest, that is to say pulled to the right, the valve 24 establishes a communication between the two chambers 12 and 14 of the booster. As the rear chamber 14 is then subjected to the same partial vacuum as the front chamber 12, the piston 22 is pushed back to the right, to the position of rest, by a spring 25, so that it rests against the internal face of the front wall of the casing 10.

Actuating the operating rod 26 towards the left has the effect, first of all, of shifting the valve 24 in such a way that it isolates the chambers 12 and 14 from one another and then, secondly, of shifting this valve in such a way that it opens the rear chamber 14 to atmospheric pressure.

The difference in pressure between the two chambers 12 and 14, which is now felt by the membrane 18, exerts on the moving partition 16 a thrust which tends to shift it towards the left and allow it to drive along the piston 22 which in turn shifts, compressing the spring 25.

The braking effort exerted on the operating rod 26, or "input force" and the brake-boosting effort, or "boost force" resulting from the thrust of the moving partition 16, are then applied together along the axis X-X' of the booster 100 in the direction of the master cylinder 200, and they combine to form the actuating force for the latter.

More specifically, the actuating force is applied to the main hydraulic piston 30 of the master cylinder and causes it to shift to the left (in the figures), and this leads to a rise in pressure of the brake fluid present in the interior volume V of the master cylinder 200, and an actuation of the brake (not represented) connected thereto.

Figure 2:
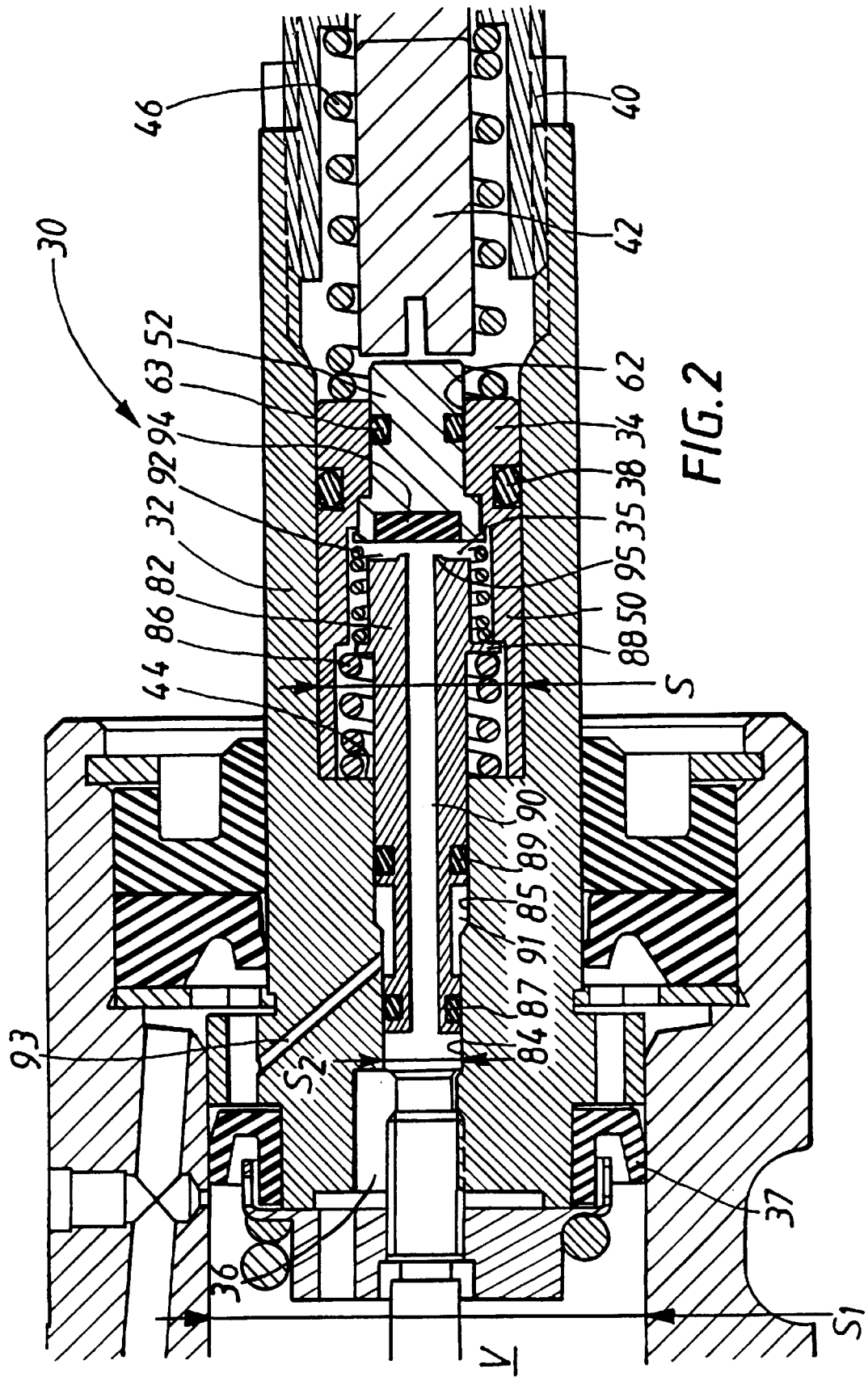
FIG. 2 represents a sectional view on a larger scale of the central part of the device of FIG. 1.

As better seen in FIG. 2, the main hydraulic piston 30 is in fact composite and comprises on the one hand a moving and hollow cylinder 32 and, on the other hand, a reaction piston 34. The interior volume 35 of the hollow moving cylinder 32 communicates with the interior volume V of the master cylinder via openings, such as 36, made in the moving cylinder 32 in an axial direction.

Apart from the passage of fluid permitted by the openings 36 between the interior volume V of the master cylinder 200 and the interior volume 35 of the moving cylinder 32, this moving cylinder 32 slides in leaktight fashion in the body of the master cylinder 200, sealing being obtained thanks at least to one annular lip seal 37.

The reaction piston 34, for its part, slides inside the moving cylinder 32, which it closes in leaktight fashion thanks to an annular seal 38. The moving cylinder 32 is connected, via a ring 40, to the rigid skirt 20 so as to receive at least part of the boost force exerted by this rigid skirt 20.

The reaction piston 34 is arranged axially facing a push rod 42 secured to the plunger 28 and capable of transmitting to it at least the input force exerted on the operating rod 26, itself secured to the plunger 28.

The way in which the device described hitherto operates will now be explained.

At rest, the various moving parts occupy the position represented in FIGS. 1 and 2, and in particular the reaction piston 34 is in abutment forwards on a radial shoulder 44 of the moving cylinder 32 under the effect of the urging of a spring 46. The valve 24 allows communication between the two chambers 12 and 14, which are therefore at the same reduced pressure.

A first effort on the brake pedal serves to overcome the preload of the return spring of the operating rod 26 and to bring the valve 24 into a position in which it isolates the two chambers 12 and 14 from one another. This increase in effort on the brake pedal therefore provides no increase in pressure in the master cylinder, and it is represented on the curve of FIG. 3 by the segment OA.

After this predetermined travel of the operating rod 26, the valve 24 opens the rear chamber 14 of the booster 100 to atmosphere, and a difference in pressures between the two chambers 12 and 14 of the booster becomes established. This pressure difference gives rise to a boost force which moves the rigid skirt 20 and the moving cylinder 32 forwards.

The hydraulic pressure in the internal volume V of the master cylinder 200 therefore rises and becomes established, by hydraulic fluid flowing through the openings 36, in the internal volume 35 of the moving cylinder 32, and is exerted on the cross section S of the reaction piston 34.

First of all, the force generated by this pressure exerted on this cross section S does not exceed the preload at rest of the spring 46, which means that the reaction piston 34 remains immobile with respect to the moving cylinder 32, and some distance from the push rod 42, no reaction therefore being felt on the brake pedal. This first operating phase is represented by the segment AB of the curve of FIG. 3. The length of the segment AB is known as the "jump" of the booster.

The booster jump may be set to any desired value by adjusting the preload at rest of the spring 46. It is possible, for example, and as has been represented in FIGS. 1 and 2, to envisage the ring 40 being threaded and screwed into the moving cylinder 32 to which it transmits at least part of the boost force exerted on the skirt 20 bearing against it.

Screwing the ring 40 into the moving cylinder 32 thus has the effect of compressing the spring 46 and therefore of increasing the preload which the latter exerts on the reaction piston 34 in the direction of the master cylinder, that is to say of increasing further the value of the jump.

In order to compensate for the reduction in length which results from screwing the ring 40 into the moving cylinder 32, this ring is, for example, made in two parts screwed together so as to have an adjustable overall length.

It is also possible to envisage the push rod 42 itself being produced in two parts screwed together so as to have an adjustable overall length, adjusting this length especially making it possible to alter the opening of the valve when the jump occurs, irrespective of the value given to this jump by screwing the ring 40 into the moving cylinder 32.

In a second phase of operation, the hydraulic pressure increases in the volumes V and 35 and reaches a predetermined value for which, when applied to the cross section S, it becomes sufficient to overcome the preload at rest of the spring 46. The reaction piston 34 therefore shifts backwards and comes into contact with the push rod 42, as illustrated by the point B of the curve of FIG. 3.

The reaction piston 34 therefore exerts on the push rod 42 and on the brake pedal a reaction force which depends on the boost force and opposes the input force and therefore allows the first force to be controlled by the second, as has been represented by the segment BC on the curve of FIG. 3. The reaction piston 34 therefore constitutes a reaction piston subjected to the hydraulic pressure prevailing in the reaction chamber consisting of the interior volume 35 of the moving cylinder 32.

The slope of this segment BC, which equals the ratio of the output pressure to the input force, represents the boost ratio of the braking device. This boost ratio is also equal to the ratio of the cross section $S_1$ of the moving cylinder 32 to the cross section S of the reaction piston 34.

The boost force reaches its maximum when the pressure in the rear chamber of the booster reaches atmospheric pressure, and can therefore not increase any further. The phenomenon known by the name of saturation and represented by the segment CD on the curve of FIG. 3 is then reached.

In all these phases of operation, it can be seen especially that apart from the travel of the plunger 28 which is needed to actuate the valve 24 and cause the pressure in the rear chamber 14 to vary, and which corresponds to the segment OA of the curve of FIG. 3, the plunger 28 and the push rod 42 shift with the moving partition 16.

The braking device which has just been described operates in the same way upon each braking action, irrespective of the rate of application of the input force to the operating rod 26, that means both for normal braking where slight deceleration of the vehicle is desired, and for emergency braking where the driver needs to stop his vehicle immediately.

In the latter case, it is of course desirable quickly to obtain a substantial braking effort, that is to say a high pressure in the hydraulic braking circuit. The present invention makes it possible to achieve this result, that is to say immediately to obtain a high braking pressure in the event of emergency braking, using means which are simple and effective and the response time of which is minimal.

As better seen in FIG. 2, the reaction piston 34 is itself composite. It includes a first part 50 which, in the position of rest, is in forwards abutment on the moving cylinder 32 under the effect of the urging from the spring 46. It also includes a second part 52 which is capable of sliding inside the first part 50, in leaktight fashion thanks to an annular seal 63.

Figure 4:
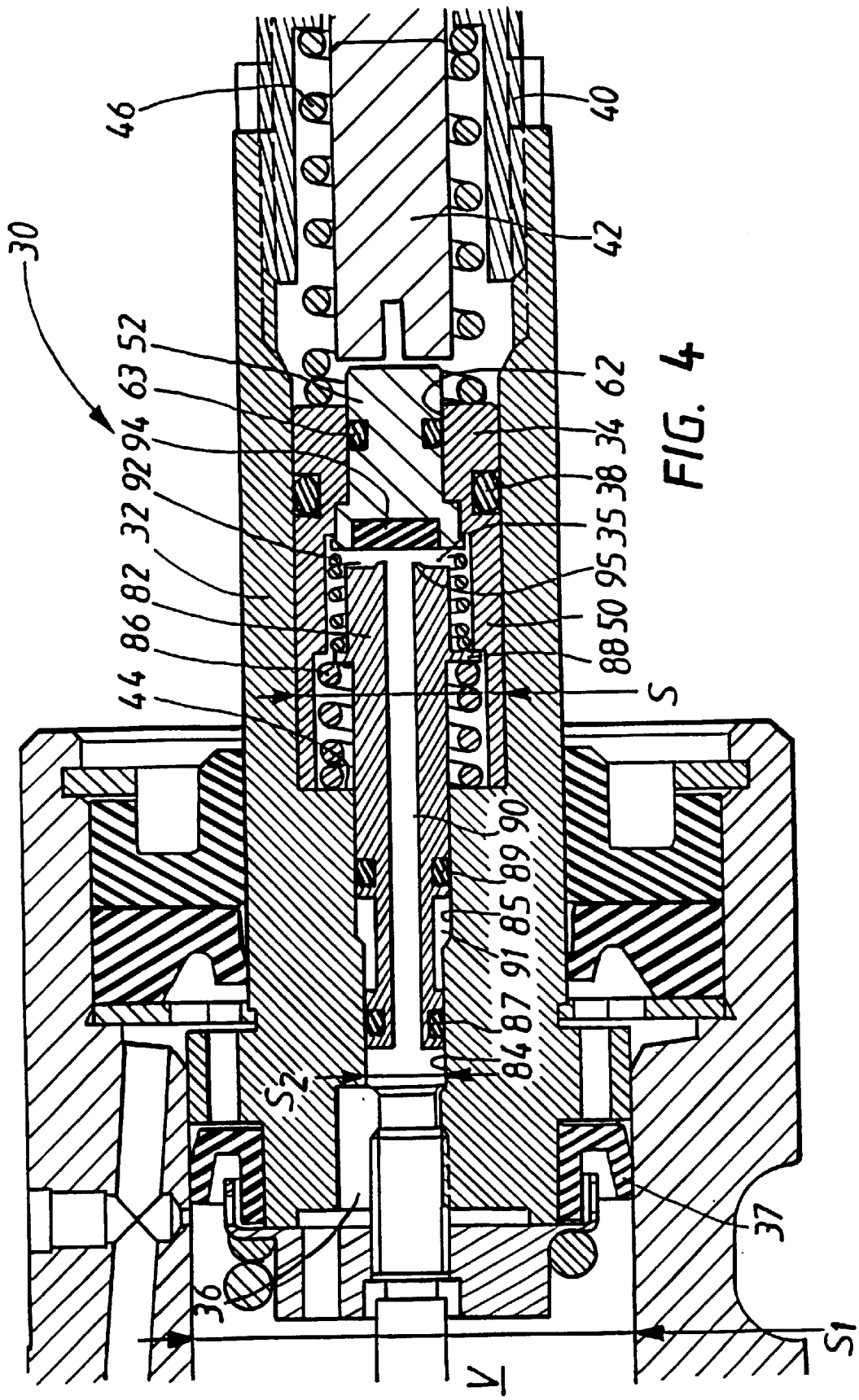
FIG. 4 is another embodiment of the braking boosted device of FIG. 1.

The moving cylinder 32 also includes a third piston 82 capable of sliding in leaktight fashion in a stepped axial bore 84–85 formed at the front of the moving cylinder 32, the smaller-diameter portion 84 being situated forward of the larger-diameter portion 85. The sliding is made leaktight thanks to seals 87 and 89. The volume 91 lying between the seals 87 and 89, the third piston 82 and the bores 84 and 85 is connected to the brake fluid reservoir at low pressure, for example via a pipe 93, so as to allow this third piston to move. As an alternative, provision may just as easily be made for this volume 91 to be closed as shown in FIG. 4. Volume 91 is isolated and filled with a compressible fluid, such as air or an inert gas such as nitrogen, in order also to allow this third piston to move.

The third piston 82 is urged backwards into the position of rest by a spring 86 in such a way that it comes into abutment backwards at rest on the first part 50, via a radial rib 88. The third piston is formed with a central through-opening 90, and a spring 92 is arranged between this radial rib 88 and the second part 52. The second part 52 is also formed with a seat 94, for example made of rubber, capable of interacting with the third piston 82 in order to close off the central opening 90. A lip 95 could advantageously be formed on the rear face of the third piston 82, around the edge of the opening 90, to make this closing-off more perfect.

The preload at rest of the spring 86 is less than that of the spring 46, and the sum of the preloads at rest of the springs 86 and 92 is lower than that of the spring 46, so that the second part 52, when at rest, is in forwards abutment against the moving cylinder 32. In addition, the spring 92 has a lower stiffness than the spring 86.

In operation, when an effort is applied to the brake pedal for a braking action where it is merely desired to slow the vehicle down in the normal way, the assembly which has just been described operates as was explained above; the pressure prevailing in the interior volume V of the master cylinder is communicated to the reaction chamber 35 via the opening 90, to be exerted on the cross section S of the first part 50 and make it move back at the same time as the second part 52 thanks to the seal provided by the annular seal 63, until the second part 52 comes into contact with the push rod 42.

At the same time, the brake fluid pressure is exerted on both ends of the third piston 82. Owing to its stepped shape and thanks to the fact that the volume 91 is connected to the reservoir, the third piston 82 behaves like a differential piston. It is subject to a force directed forwards and shifts by a distance which is proportional to the pressure prevailing in the master cylinder and as a function of the difference between the cross sections of the portions 85 and 84 of the stepped bore and of the preload at rest of the spring 86.

When the driver releases his effort on the operating rod 26, this results in a drop in pressure in the rear chamber 14 of the booster, and therefore a reduction in the boost force. The moving partition 16 is therefore returned backwards by the spring 25 and drives the moving cylinder 32 along with it. The pressure in the interior volume V of the master cylinder can then drop, as it can in the opening 90 and in the reaction chamber 35. This is because the latter permanently communicates with the interior volume V of the master cylinder via the opening 90 because the differential piston 82 has been shifted forwards. This piston will progressively return to its position of rest as the pressure in the master cylinder drops.

The characteristic operating curve of the braking device therefore conforms to the curve of FIG. 3, passing through the points O, A, B, C and D, both as the input effort increases and as this input effort decreases.

In contrast, upon a braking action under emergency conditions, that is to say when the input effort on the brake pedal increases very rapidly in order to reach a very high value, the plunger 28 and the push rod 42 advance very rapidly, and in particular they advance with respect to the rigid skirt 20, the difference in pressures between the front and rear chambers not having had time to become established and to move the moving partition 16. This phenomenon has two important consequences.

On the one hand, the additional forwards movement of the plunger 28 causes greater opening of the valve 24, which allows a more rapid pressure rise in the rear chamber 14.

On the other hand, at the same time, the push rod 42 comes into contact with the second part 52 and causes it to slide forwards in the bore 62 of the first part 50. In this movement, the spring 42 is not compressed and its only effect is to keep the first part 50 resting against the radial shoulder 44. As the stiffness of the spring 86 is greater than that of the spring 92, the latter compresses the former and allows the second part 52 to come into contact with the differential piston 82, or more precisely allows the seat 94 to come into contact with the lip 95. From this moment on, the spring 86 can in turn be compressed.

The forwards movement of the assembly formed of the second part 52 and differential piston 82 is unlimited because this assembly shifts in the reaction chamber 35 which thus has a constant volume, and because the volume 91 is connected to the low pressure brake fluid reservoir.

In this movement, the communication between the interior volume V of the master cylinder and the reaction chamber 35 is interrupted. It follows that the hydraulic pressure in the volume V of the master cylinder is exerted on the differential piston 82 on its cross section $S_2$ defined by the portion 84 of the stepped bore 84–85. This therefore means that the boost ratio under these emergency-braking conditions is equal to the ratio of the cross section $S_1$ of the moving cylinder 32 to the cross section $S_2$ of the differential piston 82 which is now resting against the second part 52 of the reaction piston 34 and on which the hydraulic pressure is exerted, and which is defined by the cross section of the bore portion 84.

As the cross section $S_2$ is smaller than the cross section S of the first part 50, this therefore means that under emergency-braking conditions, the boost ratio is higher than that obtained under normal braking conditions. The operation of the braking device is therefore represented by segment BE on the curve of FIG. 3.

It may thus be seen that for the same instantaneous input effort $F_1$, an instantaneous pressure $P_2$ is obtained which is appreciably higher than the instantaneous pressure $P_1$, obtained under normal braking conditions. Furthermore, as the boost ratio is higher, the phenomenon of saturation represented by the point E is reached sooner.

This second boost ratio can be chosen at will and given any desired value, particularly a high value, by choosing low values for the diameters of the lip 95 and of the opening 90. The opening 90 does, however, have to have a diameter which is large enough to allow the hydraulic pressure in the reaction chamber 35 to rise under normal operating conditions without constituting any restriction to the communication with the volume V of the master cylinder.

When the driver releases his effort after such an emergency braking action, the effect of the operating rod 26 returning backwards is to move the plunger 28 and the valve 24 which therefore places the front and rear chambers back in communication with one another. This therefore results in a backwards movement of the moving partition 16 and of the moving cylinder 32 under the effect of the spring 25, and a drop in pressure in the interior volume V of the master cylinder.

At the same time, as the push rod 42 has moved back, the spring 86 can push the differential piston 82 and the second part 52 backwards. This phase of operation is represented by segments DE and EB in the curve of FIG. 3. When the radial rib 88 comes into abutment on the first part 50, the point B of the curve of FIG. 3 is reached, and the spring 92 then pushes the second part 52 back until it too comes into abutment on the first part 50.

The various moving parts then return to their position of rest illustrated in FIG. 2, and the reaction chamber 35 is again in communication with the interior volume of the master cylinder.

Thus according to the present invention a boosted braking device has indeed been achieved which has improved operating characteristics in the event of emergency braking because it then has a boost ratio which is markedly higher than the one it has under normal operating conditions. This change in boost ratio is obtained automatically, without the need for sensors or a complicated electronic circuit, simply by making use of the fact that under these extreme conditions the plunger 28 and the push rod 42 have a relative movement with respect to the rigid skirt 20. For each boost ratio, the characteristic operating curve is the same for the actuating phase and for the release phase. The means used to obtain these results are relatively simple and therefore of lower cost and operate reliably under all circumstances, both under normal operating conditions and under emergency conditions.

I claim:

1. A braking device for a motor vehicle, comprising a master cylinder filled with a brake fluid and equipped with a main hydraulic piston which receives an actuating force composed of an input force and of a boost force, both acting in an axial direction, and a pneumatic booster which is operated by applying the input force to an operating rod secured to a plunger, thereby controlling opening of a three-way valve, so as to exert the actuating force on the main hydraulic piston;

whereby the booster includes a rigid casing divided in leaktight fashion into at least two chambers by at least one moving partition, which is acted upon by a difference in pressure between the two chambers resulting from the opening of the three-way valve; and wherein the moving partition moves a pneumatic piston, bearing the three-way valve and transmitting at least the boost force;

wherein the main hydraulic piston of the master cylinder includes a hollow moving cylinder receiving at least part of the boost force, a reaction piston axially slidable in the hollow cylinder, in leaktight fashion and capable of receiving at least the input force, and first elastic means exerting a first elastic force between the reaction piston and the hollow cylinder, urging the reaction piston in the axial direction;

wherein there is at least one opening in the hollow cylinder allowing communication between an interior of the hollow cylinder and an interior of the master cylinder;

wherein the reaction piston includes a normally open two-way valve means, capable of interrupting the communication between the interior of the master cylinder and the interior of the hollow cylinder;

wherein the reaction piston includes a first part which abuts the hollow cylinder, when the main hydraulic piston is in the position of rest, under the effect of the first elastic means, and a second part sliding, in leaktight fashion, in the first part, and second elastic means exerting a second elastic force on the second part in a direction opposite the axial direction, such that the second part abuts the first part, when the main hydraulic piston is in the position of rest;

a stepped third piston sliding, in leaktight fashion, in a stepped bore of the hollow cylinder and urged by third elastic means in a direction opposite the axial direction, such that the third piston abuts the first part, when the main hydraulic piston is in the position of rest, with the third piston having a central opening allowing the interior of the moving cylinder to communicate with the interior of the master cylinder;

wherein the second elastic means is between the second part and the third piston;

wherein the two-way valve means includes a seat located either on the second part or the third part; and wherein a diameter of a front portion of the stepped bore is smaller than a diameter of a rear portion of the stepped bore.

2. A braking device according to claim 1, characterized in that the pressure of the brake fluid in the interior of the master cylinder is applied to a first cross section of the reaction piston when the two-way valve means is open, and to a second cross section of the reaction piston, when the two-way valve means is closed, and wherein the second cross section is smaller than the first cross section.

3. A braking device according to claim 1, characterized in that the plunger is secured to a push rod actuating the two-way valve means in a direction of closure upon a relative movement between the plunger and the moving partition.

4. A braking device according to claim 1, characterized in that the third piston and the stepped bore define a volume which is subject to a constant pressure.

5. A braking device according to claim 4, characterized in that the volume defined by the third piston and the stepped bore is permanently connected to a brake fluid reservoir at low pressure.

6. A braking device according to claim 1, characterized in that the third piston and the stepped bore define a volume filled with a compressible fluid.

* * * * *